Feb. 21, 1950     A. M. SKELLETT     2,498,461
DETECTOR FOR HIGH ENERGY RADIATION
Filed Aug. 3, 1948
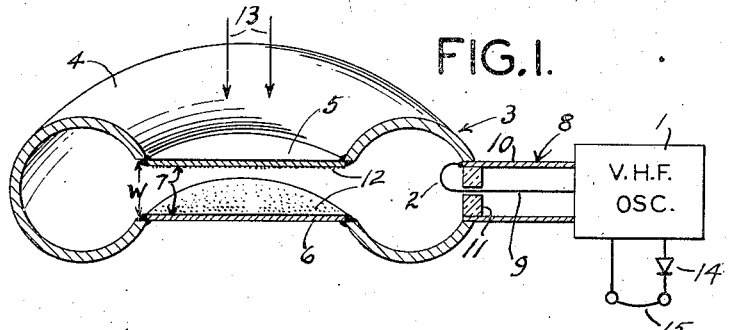
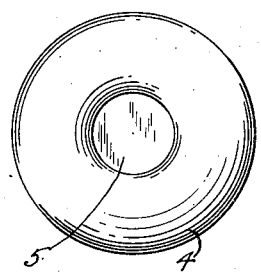
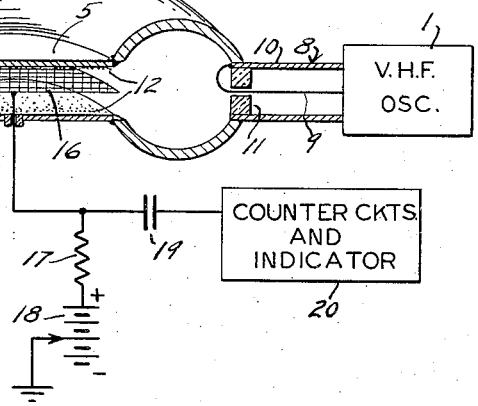
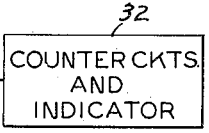
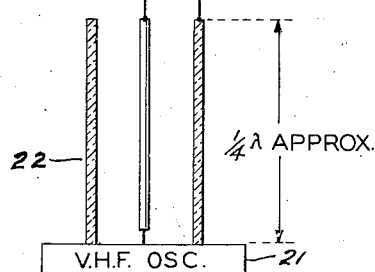
Inventor
ALBERT M. SKELLETT
By John J. Rogan
Attorney Patented Feb. 21, 1950

2,498,461

UNITED STATES PATENT OFFICE 2,498,461

DETECTOR FOR HIGH ENERGY RADIATION

Albert M. Skellett, Madison, N. J., assignor to National Union Radio Corporation, Orange, N. J., a corporation of Delaware Application August 3, 1948, Serial No. 42,229

16 Claims. (Cl. 250—83.3)

This invention relates to detecting apparatus, and more particularly it relates to means for detecting the presence of high energy particles or rays.

A principal object of the invention is to provide an improved detecting apparatus for detecting high energy particles or rays such as alpha particles, beta rays, gamma rays, cosmic rays, and the like.

Another object is to provide an improved high energy particle or ray detector wherein the particles or rays are employed to trigger the release of electrons in very large quantities for more efficient detection purposes.

A further object is to provide an improved system for converting incident high energy particles or rays into electric signals suitable for amplification and indication purposes.

A feature of the invention relates to a detector for high energy rays or particles, employing a device which has a gap to be traversed by the rays or particles, at least one wall of said gap having a coating of secondary electron emission material, and the gap walls forming part of an ultra-high-frequency oscillating resonator system whose constants are correlated with the gap dimensions to enhance the production of electrons in response to the incident radiation.

Another feature relates to a radiation detector employing an evacuated cavity resonator having a gap therein of predetermined dimensions, at least one wall of the gap having a coating of secondary electron emission material and including also a phosphor or fluorophor. The said cavity resonator is provided with at least one radiation permeable window for permitting the incident radiation to reach the said coating.

A further feature relates to a novel detector device for high energy radiation, which device is in the form of a reentrant cavity resonator. The reentrant wall or walls of the cavity resonator provide a gap with one or both walls of the gap coated with secondary electron emissive material for response to the high energy radiation passing through the wall of said resonator.

A further feature relates to a novel detector device for high energy radiation, which device is in the form of a reentrant cavity resonator. The reentrant wall or walls of the cavity resonator provide a gap with one or both walls of the gap coated with secondary electron emissive material for response to the high energy radiation passing through the wall of said resonator.

A further feature relates to a novel detector device for high energy radiation, which device is in the form of a reentrant cavity resonator having at least one of the opposed reentrant walls pervious to the said radiation and with the spacing between the walls correlated with the transit time of electrons released from said walls by the incident radiation. The gap has provided therein the specially biassed grid or similar electrode for collecting the electrons resulting from the incident radiation.

A still further feature relates to the novel organization, arrangement, and relative location and dimensioning of parts which cooperate to provide a more efficient detector for high energy particles or rays.

Other features and advantages not particularly enumerated, will be apparent after a consideration of the following detailed descriptions and the appended claims.

In the drawing which shows certain preferred embodiments,

Fig. 1 is a composite structural and schematic diagram of a detector apparatus according to the invention.

Fig. 2 is a plan view of the cavity resonator device of Fig. 1.

Figs. 3 and 4 are respective modifications of the embodiment of Fig. 1.

Referring to Fig. 1, there is shown an oscillator-generator 1 of any well-known ultra-high-frequency kind generating for example on frequency of 500 megacycles per second, which has its oscillatory determining circuit coupled by a small inductive loop 2 into a cavity resonator 3 of the reentrant wall type. This resonator may comprise, for example, the toroidal portion 4 whose reentrant walls are closed by flat circular diaphragms 5, 6, of metal or suitable conductive material. The diaphragms 5, 6, are spaced apart to form a gap 7 of a predetermined width W for purposes to be described. The oscillator 1 can be connected to the cavity by a coaxial line 8 whose center conductor 9 terminates in the loop 2, and whose outer conductor 10 is conductively connected to the wall of the cavity resonator 3. A suitable glass or other seal 11 hermetically closes the cavity which has been previously highly evacuated in accordance with the well-known pumping or evacuation techniques employed in the electron tube art. The inside surface of one or both diaphragms 5, 6, is provided with a coating 12 of secondary electron emission material such, for example, as magnesium oxide or caesium oxide, or other similar material which releases a copious supply of secondary electrons when bombarded by other electrons or by high energy particles or radiations. In accordance with one feature of the invention, the diaphragms 5, 6, are of sufficient thinness to be effectively permeable to the high energy particles or radiations which are schematically represented by the arrows 13. It is not necessary that the entire diaphragm be of this thinness, so long as a window is provided therein of a material such as is conventionally employed in Geiger-Müller counters, and so long as the vacuum within the cavity is maintained. If desired, the window for the passage of the high energy particles or radiations, can be provided at any other region of the wall of the cavity, so long as the said particles or radiations can penetrate within the cavity and reach the coating 12 on either of the diaphragms 5, 6.

In accordance with the well-known design principles of cavity resonators, the dimensions of the cavity are correlated with the frequency of oscillator 1 so that the oscillator excites the cavity with ultra-high-frequency energy at the resonant frequency of the cavity, thus causing the cavity to resonate at its fundamental mode. Under these conditions, a voltage maximum occurs across the gap 7. Let it be assumed that the radiation 13 consists of a gamma ray, and let it be assumed that at the time the ray traverses gap 7, the instantaneous voltage across the gap is at a voltage maximum. The passage of the ray through the coatings 12 will cause the release of one or more electrons from the coatings 12. If at this instant the diaphragm 6, for example, is negative with respect to diaphragm 5, an electron released from diaphragm 6 will be attracted to the opposite diaphragm 5 which at that instant is positive. The width W of the gap 7 and the ultra-high-frequency voltage from source 1 are so correlated that when an electron is released from one of the gap surfaces, it requires approximately one-half cycle of the ultra-high-frequency wave to traverse the gap to the opposite surface. When this electron reaches the said opposite surface, the voltage conditions are reversed but the electron has in the meanwhile enough energy left over so that when it strikes the said opposite surface it releases, on the average more than one secondary electron. These released secondaries then cross the gap in the opposite direction to cause the release of additional secondaries at the opposite surface of the gap. By such repetition and interaction between the reversal of the electric field and the successively released electrons, the electron current is greatly increased until eventually there is created a negative space charge within the gap 7 of sufficient magnitude to change the resonant frequency of the cavity. When this condition occurs, the voltage applied across the gap sharply drops so that the above-described electron multiplication ceases and the process stops. This change in the resonant frequency of the cavity is reflected in the oscillator 1, and by means of a suitable crystal detector 14 and a pair of head phones 15 coupled to the oscillator, this change can be observed. It will be understood, of course, that any suitabe amplifier can be connected between the crystal detector and the telephone receivers 15.

By the foregoing described arrangement, the incident particles or rays are converted into voltage pulses. While the indication means for these pulses is shown schematically in Fig. 1 as comprising a crystal detector and head phones, it will be understood that any of the counter circuits and indicating circuits such as are employed in connection with Geiger-Müller counters can be employed.

Referring to Fig. 3, there is shown a modification of Fig. 1 wherein a grid or other electron collecting electrode 16 is located in the gap 7. The remaining elements of Fig. 3 which are functionally the same as those of Fig. 1, are designated by the same numerals. In the embodiment of Fig. 3 however, the grid 16 is connected through a current limiting resistor 17 to the positive terminal of a suitable D. C. biassing source 18, the negative end of which can be adjustably connected to ground so as to apply a predetermined positive bias to the grid 16. The bias on grid 16 is chosen so that it is positive with respect to the average voltage of the cavity 3. Under these conditions, the grid 16 acts as an electron collector and does not materially interfere with the above-described electron multiplication action resulting from the incident radiation. The grid 16 can be connected through a suitable condenser 19 to the usual counter and indicating circuits 20 such as are conventionally employed with a Geiger-Müller counter.

The operation of the embodiment of Fig. 3 is otherwise the same as that of Figs. 1 and 2.

Referring to Fig. 4, there is shown a still further modification wherein the ultra-high-frequency oscillator 21 may be of lower than 500 megacycles and is coupled through a tuned quarter-wave transmission line 22 to the detector device 23. The line 22 may, for example, be a coaxial line which is resonant at one-quarter the wavelength of the fundamental frequency of oscillator 21. In this embodiment, the device 23 comprises a conventional evacuated glass bulb 24 having suitably supported therein in spaced relation a pair of parallel metal plates 25, 26, whose opposing surfaces are coated with any well-known secondary electron emission material such as described above for the coatings 12. Also supported within the bulb 24 and located between the plates 25 and 26 is a wire grid 27 which is connected through the current limiting resistor 28 to the positive terminal of a D. C. supply such as battery 29, the negative end of which can be adjustably connected to ground to apply a predetermined positive bias to the grid 27. This bias is preferably adjusted so that it is above the average potential existing across the plates 25, 26. The incident radiation represented by the arrows 30 is arranged to strike the plate 25 or 26. As pointed out above, the plates 25 and 26 are spaced apart a distance which is preferably related to the radio frequency voltage from source 21 so that an electron released from one plate requires a time corresponding approximately to one-half cycle of the radio frequency voltage before it arrives at the opposite plate. As a result, the incident radiation 30 initiates an avalanche of electron multiplication between the plates 25 and 26, and eventually the current collected by the grid 27 flowing through resistor 28 causes a substantial voltage drop across this resistor which changes the transit time of the electrons across the gap and thus the device becomes non-resonant and inefficient and the electron multiplication ceases. This condition is detected by the grid 27 which acts as an electron collector and is coupled through the condenser 31 to the usual counter and indicator circuits 32.

In all the preceding embodiments the secondary emission coatings on the members 5, 6, and on the plates 25, 26, may contain in addition to the secondary emission material a phosphor or a fluorophor such as zinc sulfide, calcium tungstate, naphthalene, etc., so that the incident radiation 13 (Fig. 1) or 30 (Fig. 4) will produce a scintillation of light which will cause the initial release of electrons from the members 5, 6, or the plates 25, 26, by photoelectric action. It has been found that some of these phosphors generate a pulse of light that lasts for two microseconds in response to the passage for example of an alpha ray. If the cavity 3 is oscillating at 500 megacycles for example, and if this pulse of light releases $5.6 \times 10^{-11}$ coulombs, as has been found, this will result in a spreading of millions of electrons over as large as 1,000 cycles of voltage change from the oscillator, so that the device then becomes independent of the actual instant of time that the incident radiation strikes the coated surface.

The expression "high energy radiation" as employed in the claims is intended to cover high energy waves of which gamma rays, beta rays, cosmic rays are typical; and also high energy particles of which alpha particles are typical; and as distinguished from relatively slow moving electrons such as those developed by thermionic means and the like.

The term "phosphor" as employed in the claims is intended to cover not only phosphorogens for producing phosphorescent effects but also materials for producing fluorescent effects such as are commonly used in fluorescent lamps, cathode-ray tubes, television tubes and the like.

While certain specific embodiments have been described herein, it will be understood that various changes and modifications may be made therein without departing from the spirit and scope of the invention. Thus, while the preferred spacing between electrodes 5, 6, or 25, 26, is equal to one-half wavelength of the excitation voltage, this spacing may be any integral multiple of such half wavelength, for example $3/2\lambda$, $5/2\lambda$, etc.

What is claimed is:

1. Apparatus for detecting high energy radiation arising from an external source, comprising an evacuated device having a pair of conductive members defining a gap, at least one of said members having a coating of secondary electron-emissive material, means to excite said members with a high frequency voltage, at least part of the wall of said device being pervious to the said radiations from said external source to permit them to enter said gap.

2. Detecting apparatus according to claim 1 in which said members are spaced apart a distance correlated with the said excitation voltage so that the transit time of an electron from one member to the other is approximately equal to one-half cycle of said excitation voltage.

3. Detecting apparatus according to claim 1 in which said coating also includes a phosphor.

4. Detecting apparatus according to claim 1 in which at least one of said conductive members forms part of the wall of said evacuated device.

5. Detecting apparatus according to claim 1 in which both said members form wall portions of said evacuated device.

6. Detecting apparatus according to claim 1 in which said evacuated device is in the form of a conductive envelope forming a cavity resonator.

7. Detecting apparatus according to claim 1 in which said device is in the form of a conductive envelope forming a cavity resonator which is resonant at the frequency of the said excitation voltage.

8. Detecting apparatus according to claim 1 in which said device is a cavity resonator of the reentrant wall type, the reentrant walls constituting said gap-forming members.

9. Detecting apparatus according to claim 1 in which a positively biased electron collector electrode is interposed in said gap.

10. Detecting apparatus according to claim 1 in which a positively biased electron-collecting grid is interposed in said gap.

11. Detecting apparatus comprising a conductive evacuated envelope constituting a cavity resonator with opposed wall portions thereof defining a gap, at least one of said wall portions being permeable to high energy radiations, the opposed inner surfaces of said wall portions being coated with material which emits secondary electrons in response to the said radiation entering said gap, a source of high frequency voltage coupled into said cavity resonator and to which said cavity is resonant, and a wave detecting device coupled to said source to detect resonance changes in said cavity.

12. Detecting apparatus according to claim 11 in which said coating material includes a phosphor.

13. Detecting apparatus for high energy radiation, comprising, an evacuated envelope having at least a portion of its wall surface permeable to said radiation, a pair of conductive members defining a gap within said receptacle the surfaces of at least one of said members being coated with secondary electron emission material, a source of ultra-high-frequency voltage connected across said members, the frequency of said source having a half period which is approximately equal to the electron transit time across said gap when said voltage is applied thereacross, an electron collector electrode located in said gap, means to positively bias said collector electrode with respect to the average voltage across said gap, and signal indication means connected to said collector electrode.

14. Detecting apparatus according to claim 13 in which said source of ultra-high-frequency voltage is connected to said members through a tuned transmission line which is resonant at approximately one-quarter wavelength of the said high frequency voltage.

15. Detecting apparatus according to claim 13, in which said positive biassing means is connected to said collector electrode through a resistance, and said indication means is connected to said collector electrode through a capacitor.

16. Detecting apparatus according to claim 1 in which said members are spaced apart a distance correlated with the said excitation voltage so that the transit time of an electron from one member to the other is approximately equal to $n/2$ cycles of said excitation voltage where "$n$" is an integer.

ALBERT M. SKELLETT.

REFERENCES CITED

The following references are of record in the file of this patent:

UNITED STATES PATENTS

| Number | Name | Date |
|---|---|---|
| 2,295,396 | George | Sept. 8, 1942 |